(12) United States Patent
Horikiri et al.

(10) Patent No.: US 6,333,081 B1
(45) Date of Patent: Dec. 25, 2001

(54) LIQUID CRYSTAL DEVICE

(75) Inventors: Tomonari Horikiri, Atsugi; Hiroyuki Kitayama, Isehara, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,290

(22) Filed: Feb. 18, 2000

(30) Foreign Application Priority Data

Feb. 19, 1999 (JP) .................................................. 11-041161
Feb. 16, 2000 (JP) .................................................. 12-037924

(51) Int. Cl.$^7$ .......................... C09K 19/56; C09K 19/54; G02F 1/1337
(52) U.S. Cl. ................... 428/1.1; 252/299.4; 252/299.5; 349/191
(58) Field of Search ............................ 252/299.01, 299.5, 252/299.4; 428/1.1; 349/191, 94

(56) References Cited

U.S. PATENT DOCUMENTS

| | | | |
|---|---|---|---|
| 5,599,479 | 2/1997 | Shinjo et al. | 252/299.61 |
| 5,641,427 | 6/1997 | Shinjo et al. | 252/299.01 |
| 5,688,437 | 11/1997 | Sato et al. | 252/299.61 |
| 5,863,458 | 1/1999 | Miyata et al. | 252/299.01 |
| 5,948,317 | 9/1999 | Sato et al. | 252/299.61 |
| 6,017,465 | 1/2000 | Naito | 252/299.01 |
| 6,072,552 | * 6/2000 | Komura et al. | 349/86 |

FOREIGN PATENT DOCUMENTS

| | | |
|---|---|---|
| 6043440 | 2/1994 | (JP) . |
| 08-254688 | 10/1996 | (JP) . |
| 11-021556 | 1/1999 | (JP) . |
| 11-052341 | 2/1999 | (JP) . |
| 11256164 | 9/1999 | (JP) . |

OTHER PUBLICATIONS

CAPLUS 2000: 778286.*

* cited by examiner

*Primary Examiner*—Shean C. Wu
(74) *Attorney, Agent, or Firm*—Fitzpatrick, Cella, Harper & Scinto (57) ABSTRACT

A liquid crystal device is constituted by a pair of substrates each provided with an axis for aligning liquid crystal molecules in a uniaxial aligning direction, and a liquid crystal composition disposed between the pair of substrates and comprising at least a liquid crystal and an aligned gel-forming compound forming a gel with the liquid crystal. The gel-forming compound is aligned in a direction substantially parallel or perpendicular to the uniaxial aligning direction.

6 Claims, 3 Drawing Sheets

LIQUID CRYSTAL DEVICE

FIELD OF THE INVENTION AND RELATED ART

The present invention relates to a liquid crystal device using a liquid crystal composition comprising a liquid crystal material and gel-forming compound placed in a specific alignment state.

With development of information equipment, social needs of a thin display device of a low power consumption-type have been considerably increased in recent years. In order to meet such needs, a liquid crystal display device as one of display devices with a smaller thickness of a lower power consumption-type has been extensively developed. Particularly, liquid crystal display devices using a nematic liquid crystal or a ferroelectric liquid crystal have already been commercialized. For this purpose, as a liquid crystal material for realizing a display device providing a wider temperature range including room temperature of a liquid crystal (mesomorphic) phase, a composition or mixture of a plurality of mesomorphic compounds having mutually different core (skeleton) structures.

Such a liquid crystal composition, however, generally requires may constituent compounds in mixture in order to enlarge the mesomorphic temperature range, thus necessitating accumulated experiences or experiments and a complicated mixing step of many constituent compounds possessing different physical and mesomorphic properties.

In recent years, many liquid crystal compositions comprised of relatively smaller number of components of various compounds have been proposed.

Specifically, a liquid crystal composition comprising a low-molecular weight liquid crystal and a low-molecular weight amorphous compound and having a structure such that the low-molecular weight amorphous compound forms a domain of a network structure via hydrogen bonds and the low-molecular weight liquid crystal is dispersed in the domain has been proposed (Japanese Laid-Open Patent Application (JP-A) 8-254688). Further, liquid crystal device excellent in self-supporting characteristic without using aligning control films has been prepared by using a liquid crystal composition having a structure constituted by a side-chain type mesomorphic polymer formed through hydrogen bonds, a low-molecular weight liquid crystal and an electrolyte (JP-A 6-43440). These liquid crystal compositions (systems) are based on intermolecular force using hydrogen bond and another system utilizing hydrogen bond has been proposed by, e.g., Takashi Kato et al ("Polymer Preprints", Japan, vol. 46 (12), pp.3174–3175 (1997) and "Lecture Preprints on Discussion of Japan Liquid Crystal Society (1998)", 1B01 and 1B02).

However, these documents have encountered the following difficulties.

JP-A 8-254688 requires an amount of at least 10 wt. % of the low-molecular weight amorphous compound for forming the network structure. JP-A 6-43440 requires the use of the side-chain type mesomorphic polymer formed by utilizing hydrogen bonds and the liquid crystal used in necessary to assume smectic A phase when mixed with the mesomorphic polymer, thus restricting a liquid crystal material.

The documents of Kato et al have reported that it is possible to effect aligning control of liquid crystal molecules by utilizing hydrogen bonds formed between self-assembly (aggregating) type molecules to cause gelation of a liquid crystal material.

Similarly, JP-A 11-21556 and 11-52341 (corr. to EP-A-896048) have proposed a liquid crystal gel consisting of liquid crystal molecules and a gelling agent and a liquid crystal device using the liquid crystal gel. Further, JP-A 11-256164 has proposed a gel-state substance comprising an amino acid-based gelling agent and a mesomorphic compound and a display device using the gelling agent.

However, these documents describing the use of the gelling agent are silent about an aggregating direction thereof or a resultant alignment (or orientation) state of the resultant gel-state molecules. In these documents, the gel-state molecules within a network structure are considered to assume a random alignment state except for a particular electric field application state.

In such a liquid crystal device wherein the gel-state molecules and the liquid crystal molecules are generally aligned or oriented randomly or irregularly, a switching behavior of the liquid crystal molecules is liable to be impaired to lower a contrast and gradation performance of the resultant liquid crystal device.

SUMMARY OF THE INVENTION

In view of the above problems, a principal object of the present invention is to provide a liquid crystal device having solved the above problems.

A specific object of the present invention is to provide a liquid crystal device capable of improving a switching characteristic of liquid crystal molecules.

Another object of the present invention is to provide a liquid crystal device capable of increasing a contrast and realizing a gradational display.

According to the present invention, there is provided a liquid crystal device, comprising:

a pair of substrates each provided with an axis for aligning liquid crystal molecules in a uniaxial aligning direction, and a liquid crystal composition disposed between the pair of substrates and comprising at least a liquid crystal and an aligned gel-forming compound forming a gel with the liquid crystal, wherein said gel-forming compound is aligned in a particular direction defined relative to the uniaxial aligning direction.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

The liquid crystal composition used in the liquid crystal device according to the present invention comprises at least a liquid crystal and an aligned gel-forming compound forming a gel with the liquid crystal.

When the liquid crystal composition is disposed between a pair of substrates each of which has been subjected to a uniaxial aligning treatment (e.g., rubbing) for aligning liquid crystal molecules in one direction, the gel-forming compound is substantially aligned or oriented in a direction relative to a longer axis direction of liquid crystal molecules aligned with the uniaxial aligning axis direction. Specifically, the gel-forming compound may preferably be aligned in a direction substantially parallel to or perpendicular to the uniaxial aligning axis direction.

Figure 1A:
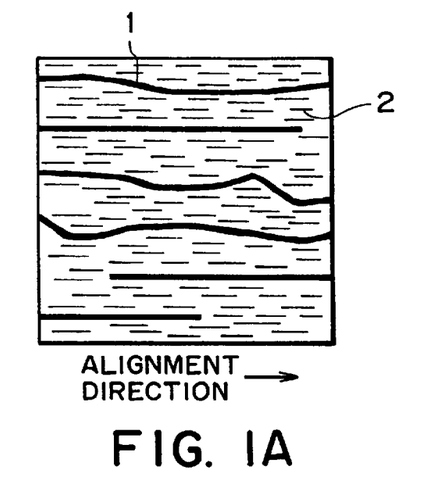
FIGS. 1A and 1B are respectively a schematic plan view for illustrating an embodiment of an alignment state of a liquid crystal composition comprising a liquid crystal and a gel-forming compound used in the liquid crystal device of the present invention.
Figure 1B:
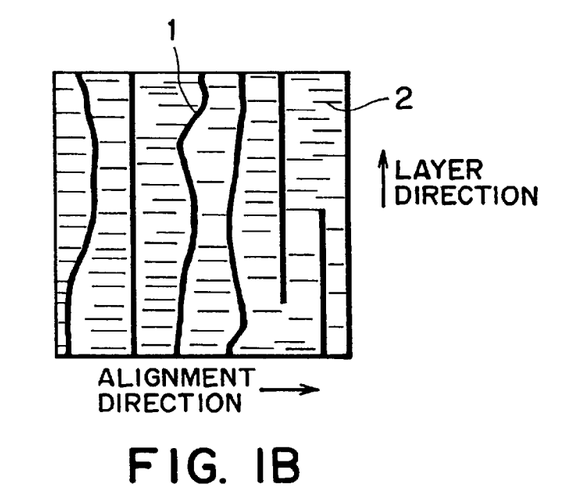

FIGS. 1A and 1B show alignment states of a gel-forming compound 1 relative to a liquid crystal 2 in relation to the direction of the uniaxial aligning axis.

FIG. 1A illustrates an alignment state wherein the gel-forming compound molecules 1 are aligned with the liquid crystal molecules 2 and are in parallel with the uniaxial aligning axis direction. FIG. 1B illustrates an alignment state wherein the gel-forming compound molecules 1 are aligned in a liquid crystal molecular layer extension direction perpendicular to (the longer axis direction of) the liquid crystal molecules 2 in alignment with the uniaxial aligning axis direction. In these figures, the gel-forming compound molecules 1 are aligned in a direction parallel or perpendicular to the uniaxial aligning axis direction and the liquid crystal molecules 2 are regularly aligned so as to surround the gel-forming compound molecules.

In the present invention, between the gel-forming compound molecules and the liquid crystal molecules, an aligning control force is exerted.

Herein, the term "aligned gel-forming compound (forming a gel with the liquid crystal)" means a compound having a supermolecular structure constituted by fibrous associated molecules aligned or oriented in a particular direction. Specifically, the gel-forming compound is a compound forming a supermolecular structure or an associated structure of fibrous molecules possessing a geometrical order by the interaction of a relatively weak force exerted between the fibrous molecules (intermolecular interaction), i.e., a self-organizing or self-assembly (aggregation) compound. Such an intermolecular interaction is different from covalent bond forming a firmly bonded state between molecules based on sharing of electrons by a pair of atoms. Examples of the intermolecular interaction may include non-covalent bonds, such as hydrogen bond, ionic bond, hydrophobic bond, electrostatic force, van der Walls force and charge-transfer interaction. The bonding forces of these non-covalent bonds are generally one-several tenth of that of the covalent bond. However, when many bonding points of the non-covalent bonds are formed, the resultant gel-forming compound has a considerably firm (associated) structure.

Further, in the field of biology, it has been known that strictly organized molecular complex or films are formed by selective association as in supermolecules, such as structure formation of cell, various metabolic processes (e.g., enzyme reaction) and information transmission (e.g., association of DNA (deoxyribonucleic acid), with respect to organism. As a result, a new function and/or highly positional-selective or stereo-selective reaction which are not observed in the case of constitutional elements alone are realized. It is also possible to provide properties or structure capable of effecting self-repairing or chemical reaction very efficiently by appropriately changing the supermolecular structure, as desired. Thus, by forming the supermolecular structure, it becomes possible to attain strict ordered-structure or a new function which have not been achieved by a conventional polymer based on covalent bonds.

In the present invention, by mixing a gelling agent capable of forming the above-mentioned aligned gel-forming compound having the supermolecular structure with the liquid crystal, it is possible to form an aggregation or associated structure of the gelling agent having almost regular alignment (orientation) in a field of aligned liquid crystal molecules, thus realizing an alignment state of the gel-forming compound having a certain interaction with the liquid crystal molecules. The gel-forming compound in such an alignment state forms a network structure into which the liquid crystal molecules are incorporated in a bulk state before injected into a device or cell, thus gelling the liquid crystal molecules. In this case, the alignment of the liquid crystal molecules can be regulated by an ordinary method, such as an appropriate aligning treatment (e.g., rubbing or the use of shearing force or homeotropic alignment film), a magnetic-field aligning method and a temperature gradient method.

In order to consider a mechanism of formation of the gel-forming compound (regularly aligned aggregate or associated compound) from the gelling agent, observation through a polarizing microscope with cross-nicol polarizers of an alignment state of molecules constituting the above-mentioned liquid crystal composition is performed while changing a temperature, of a liquid crystal cell having been subjected to a uniaxial aligning treatment and including the liquid crystal composition, from high temperatures to room temperature. As a result, two different alignment states as shown in FIGS. 1A and 1B are observed depending on the kind of a liquid crystal material used.

Specifically, FIG. 1A is a plan view showing an alignment state of a gel-state liquid crystal composition comprising a nematic liquid crystal and an aligned gel-forming compound (obtained from a gelling agent) filled in a parallel-rubbed cell and FIG. 1B is a plan view showing an alignment state of a gel-state liquid crystal composition comprising a liquid crystal having smectic A phase and an aligned gel-forming compound filled in a parallel-rubbed cell.

Referring to FIG. 1A, on temperature decrease from a high temperature, the gelling agent was changed into a fibrous compound so that long axes of the fibrous compound molecules were substantially aligned with the uniaxial aligning axis direction in a state that the liquid crystal molecules are still in an isotropic liquid phase. Thereafter, the liquid crystal molecules caused transition from the isotropic (liquid) phase to nematic phase. Accordingly, in the present invention, it is preferable that the phase transition temperature of the nematic liquid crystal is set to be lower than the gelling (aggregation) temperature of the gelling agent by appropriately selecting a mixing ratio of the gelling agent and the liquid crystal. Further, it has been confirmed that the composition gelled also in its bulk state.

In FIG. 1B, it was confirmed that long axis of fibrous compound molecules were aligned in a direction parallel to a layer (extension) direction of smectic liquid crystal molecules in smectic A phase (SmA) but perpendicular to the uniaxial aligning axis direction. This phenomenon was also confirmed in smectic C phase (SmC) or chiral smectic C phase (SmC*). In these cases, the gelation (aggregation) of the gelling agent was caused and the resultant fibrous compound molecules were aligned with the smectic molecular layer direction after the smectic liquid crystal caused phase transition to smectic phase on rapid cooling and was leftstanding for 1 hour in the smectic-phase temperature. In other words, the gel-forming compound was aligned in a direction substantially perpendicular to the smectic layer extension direction. Accordingly, in this case, the mixing ratio of the gelling agent and the smectic liquid crystal may preferably be selected so as to cause the gelation of the gelling agent at a temperature lower than the phase transition temperature to smectic phase of the smectic liquid crystal material. In a bulk state, it was also confirmed that the liquid crystal composition (comprising the smectic liquid crystal and the gelling agent) gelled.

On the other hand, in a similar manner, when a liquid crystal composition for comparison comprising a liquid crystal and a compound which could not form a supermolecular structure was observed through the polarizing microscope, the resultant structure was found to assume a random alignment state although the liquid crystal assumes a mesomorphic phase.

Accordingly, in the present invention, an alignment control force is presumably exerted between the gel-forming compound and the liquid crystal based on an occurrence of some (intermolecular) interaction therebetween.

We have found that the resultant liquid crystal device using the above-mentioned gel-state composition provides advantageous functions and properties (which cannot be achieved by the property of the liquid crystal material alone) based on the interaction of the regularly aligned gel-forming compound (obtained from the gelling agent) with the liquid crystal material used. Specifically, the resultant liquid crystal device of the present invention can realize an increase in contrast, smooth switching due to improvement in switching behavior of the liquid crystal, and a good gradational display performance, as described hereinafter in detail.

The liquid crystal composition used in the liquid crystal device according to the present invention comprises a liquid crystal and an aligned gel-forming compound as described above.

The liquid crystal may preferably be a low-molecular weight liquid crystal and assume mesomorphic (liquid crystal) phases including at least nematic phase, smectic phase, chiral smectic phase or cholesteric phase in an operation temperature range of the liquid crystal device. For this purpose, the liquid crystal may be a liquid crystal mixture of two or more species of liquid crystal materials.

The liquid crystal composition may further contain other additives as desired. Examples of the additives may include a dichromatic colorant, an electrolyte and a stabilizer. These additives may be known compounds and can be used in the present invention if they can be dissolved in the liquid crystal or interact with the liquid crystal.

In the liquid crystal composition, the content of the gelling agent (forming the gel-forming compound) per a total amount of the gelling agent and the liquid crystal may appropriately be set within the extent not adversely affecting the contrast of the liquid crystal deice and may preferably be in a range of 0.01–20 wt. %, more preferably 0.1–10 wt. %.

The gelling agent (forming the gel-forming compound) for causing gelation of the liquid crystal contained in the liquid crystal composition may be an amino acid derivative having a low-molecular weight, preferably a weight-average molecular weight (Mw) of at most 1000.

The gelling agent may preferably have a molecular structure having a hydrogen bond-forming group (substituent) such as amino group, carbamoyl group, amido group, urea group, carbamate group, alkoxy group, hydroxy group or phosphoric group. The kind, number and structural position of the hydrogen bond-forming group may appropriately be selected.

The gelling agent may be dissolved in the liquid crystal irrespective of application of external energy, such as heating and may be used in a crystalline state within the extent that the precipitated crystal has a grain size not adversely affecting an appearance of a display region of the resultant liquid crystal device in an operation temperature range.

The liquid crystal composition may comprise a composite of the liquid crystal and the gel-forming compound such that a new supermolecular structure is formed by the interaction between the liquid crystal and the gel-forming compound.

In the present invention, various analyzing methods may be employed in order to clarify the structure of the gel-forming compound. Examples of such analyzing methods may include infrared spectroscopic analysis using variable heat energies, differential scanning calorimetry (DSC), observation with polarizing microscope, X-ray diffraction analysis, observation with scanning electron microscope (SEM) and observation with transmission electron microscope (TEM). For instance, it is possible to determine temperatures of generation and extinction for phase transition peaks by the DSC and polarizing microscope observation and determine a change in crystal diffraction due to formation of a composite structure. Further, it is possible to confirm that the extinction or shift of peaks for a substituent having a non-covalent bond due to a temperature change are identified by the infrared spectroscopic analysis. As a result, it is possible to determine the supermolecular structure of the gel-forming compound (and the liquid crystal). In addition, the observation through the SEM or TEM allows confirmation of a network structure comprising a strictly ordered structure based on the supermolecular structure.

The gelling agent for forming the gel-forming compound may comprise the amino acid derivatives as described above. The amino acid derivatives may include known amino acids and derivatives thereof.

Examples of the amino acids may include glycine, alanine, valine, leucine, isoleucine, serine, threonine, cysteine, cystine, methionine, proline, aspartic acid, asparagine, glutamic acid, glutamine, histidine, lysine, ornitine, arginine, phenylalanine, tyrosine, and tryptophan.

Examples of the amino acid derivatives may include peptides constituted by 2–10 species, preferably 2–5 species, of the above amino acids.

These amino acid derivatives may preferably contain an amino acid unit comprising valine, isoleucine, alanine, glycine or leucine.

The amino acids constituting the amino acid derivatives has a terminal amino group and a terminal carboxyl group. These amino and carboxyl groups may be protected by a protective group and substituted by a substituent. In this regard, when the terminal amino group is protected by the protective group, the terminal carboxyl group is substituted by the substituent. Further, when the terminal amino group is substituted by the substituent, the terminal carboxyl group is protected by the protective group.

Examples of the protective group may include known groups used for that purpose and may preferably include benzyloxycarbonyl (carbobenzoxy group generally represented by "Z" group and benzyloxy (benzyl ester) group ("-OBzl" group).

Examples of the substituent may preferably include those having a group derived from carboxyl group or amino group similar in structure to those of the liquid crystal material used (referred to as "mesomorphic (liquid crystal) substituent"). Such a mesomorphic substituent is effective in enhancing affinity or mutual solubility with the liquid crystal to be blended with the amino acid derivative. Accordingly, the structure of the substituent may appropriately selected depending on that of the liquid crystal used.

Preferred examples of the mesomorphic substituent may include the following groups represented by formulas (1), (2) and (3)

(formula 1)

(formula 2)

(formula 3)

Other than the mesomorphic substituent, the substituent may also include hydrogen atom, saturated linear (straight chain) hydrocarbon or aliphatic group having 1–29 carbon atoms and saturated branched hydrocarbon or aliphatic group having 1–29 carbon atoms. Examples of the linear aliphatic group may include nonyl, decyl, lauryl, tridecyl, myristyl, pentadecyl, palmityl, heptadecyl, stearyl, arachidyl, decosanoyl, tricosyl, tetracosyl, hexacosyl, and triacontyl. Examples of the saturated branched aliphatic group may include 3,5,5-trimethylhexyl, 2-hexyldecyl and 2-methylhexadecyl. These substituents may be used singly or in combination f two or more species.

Figure 2:
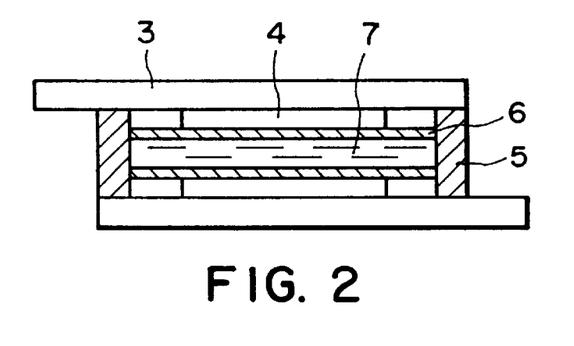
FIG. 2 is a schematic sectional view of an embodiment of the liquid crystal device of the present invention.

The liquid crystal device according to the present invention has a cell structure as shown in FIG. 2.

Referring to FIG. 2, the liquid crystal device includes a pair of glass substrates 3, transparent electrodes 4 (of, e.g., ITO (indium tin oxide)) disposed on the glass substrates 1, respectively, aligning control films 6 disposed on the transparent electrodes 4, respectively, and a liquid crystal layer 7 disposed between the aligning control films 6. The pair of substrates 1 are bonded to each other at the periphery thereof via an adhesive layer (sealing agent) 5.

The liquid crystal device of the present invention may generally be prepared by injecting the above-described liquid crystal composition into a gap between the pair of substrates each provided with the transparent electrode and the aligning control film.

The liquid crystal device of the present invention may be used as a liquid crystal display device of a reflection-type or a transmission-type.

Hereinbelow, the present invention will be described more specifically based on Examples with reference to the drawings.

EXAMPLE 1

1.5g of L-valyl-L-valine and 1.5 ml of triethylamine (TEA) were added to 30 ml of water. In the mixture on an ice bath, a solution of 1.2 ml of benzyloxycarbonyl chloride (Z—Cl) in 20 ml of tetrahydrofuan (THF) was added dropwise, followed by stirring for 2 hours on the ice bath and then standing overnight at room temperature. The resultant mixture was washed with 100 ml of ethyl acetate. In the mixture on the ice bath, 1N-HCl solution was added dropwise, thus precipitating a crystal. The crystal was recovered by filtration and washed with cold water, followed by drying under reduced pressure to obtain 1.8g of L-valyl-L-valine of which amino group was protected by benzyloxycarbonyl group (Z-Val-Val).

Then, 1.8g of the thus-obtained Z-Val-Val, 1.6g of an amine compound represented by a formula (4) shown below, 2.0g of 1-ethyl-3-(3-dimethyl aminopropyl)carbodiimide (WSC: water-soluble carbodiimide), and 1.4g of 1-hydroxy-1H-benzotriazole (HOBT) were added to 100 ml of THF.

(formula 4)

On the ice bath, 1.5 ml of TEA was added dropwise to the mixture, followed by stirring for 2 hours and then standing overnight at room temperature. Thereafter, the resultant mixture was subjected to filtration, followed by distilling-off of the solvent and then addition of 200 ml of ethyl acetate for dissolution. The resultant solution was successively washed with 200 ml of 1N-HCl solution, 200 ml of saturated sodium hydrogencarbonate and water, followed by drying with anhydrous magnesium sulfate. Thereafter, the resultant solution was concentrated by evaporation under reduced pressure, followed by re-crystallization from a mixture solvent of ethyl acetate and hexane to obtain 2.2g of an objective amino acid derivative represented by the following formula (5).

(formula 5)

The thus-prepared amino acid derivative of the formula (5) and a nematic liquid crystal ("TL216", mfd. by Merck Co.) were mixed so as to provide a content of the amino acid derivative of the formula (5) of 0.1 wt. % (=(the weight of amino acid derivative)×100/(the weight of amino acid derivative and the weight of nematic liquid crystal).

The mixture was dissolved in chloroform and subjected to ultrasonic treatment to prepare a liquid crystal mixture solution, followed by distilling-off of the solvent to obtain a nematic liquid crystal composition.

After cooling the liquid crystal composition to room temperature, the liquid crystal composition was subjected to an inverted test tube method (a method wherein a prescribed amount of a sample is placed in a test tube, which is capped and turned upside down to observe whether the sample flows or not), thus confirming a gel state of the liquid crystal composition.

As a test cell, a single-pixel cell having a structure shown in FIG. 2 was prepared in the following manner.

On each of a pair of glass substrates 3 (substrates of soda-line glass) each having or planar area (25 mm×22 mm), an ITO electrode 4 in a thickness of 200–300 Å wa formed by sputtering and thereon, ca. 100–150 Å-thick polyimide aligning control film 6 ("LX-1400", mfd. by Hitachi Kasei Kogyo K.K.) was formed, followed by subjected to rubbing treatment (as uniaxial aligning treatment) with a rubbing roller (outer diameter: 58 mm) on which polyester fibers (length: 8 mm) were disposed under the rubbing conditions including a roller revolution rate of 600 rpm, a substrate moving speed of 2 m/min., and 7 times of reciprocating operation, thus providing the aligning control films 6 with parallel uniaxial aligning axes directed in the same direction. After the rubbing treatment, the substrates 3 were washed with isopropyl alcohol (IPA).

The thus-treated pair of glass substrates were bonded to each other at the periphery by using a sealing agent comprising amine-curabe epoxy resin containing silica beads (average diameter: ca. 5 $\mu$m), thus preparing a blank cell having a cell gap of 5 $\mu$m.

Under heating at 110° C., the nematic liquid crystal composition prepared above was injected into the gap of the blank cell by utilizing capillary action, followed by gradual cooling to room temperature at a rate of 3° C./min. to prepare a liquid crystal device (test cell).

The liquid crystal device was subjected to observation through a polarizing microscope ("OPTIPHOTO-PDL", mfd. by Nikon K.K.; magnification =80) in combination with a temperature-control system ("Thermosystem FP90", mfd. by Mettler Co.).

As a result, the nematic liquid crystal composition showed such an alignment state as shown in FIG. 1A that nematic liquid crystal molecules were aligned with the rubbing direction and gel-forming (fibrous) compound molecules were also aligned to their long axes. This alignment state disappeared by heating and appeared again by cooling, thus exhibiting a thermally reversible state.

Then, the nematic liquid crystal composition was melted by heating and placed dropwise on a hydrophilic slide glass which had not been subjected to rubbing treatment to form a liquid crystal gel film.

The liquid crystal gel film was dried under reduced pressure at a temperature below the phase transition temperature between the gel-state phase to the isotropic (liquid) phase to remove the liquid crystal composition to obtain only the gel-forming compound.

Thereafter, the gel-forming compound was coated with an Au layer by using an ion coater and subjected to observation through a scanning electron microscope (SEM) ("S-570LB", mfd. by Hitachi Seisakusho K.K.; magnification=10000 and 30000).

As a result, the gel-forming compound was found to have a width of 50–100 nm and a non-directional network structure.

On the other hand, a liquid crystal gel film was formed in the same manner as in the above case except that the nematic liquid crystal composition was placed dropwise on a glass substrate subjected to rubbing treatment and was then subjected to similar observation through the SEM. As a result, the gel-forming compound molecules were found to be substantially aligned with the rubbing direction.

Accordingly, it was confirmed that it become possible to align the gel-forming compound molecules in a direction identical to the liquid crystal alignment direction by the interaction of the gel-forming compound with the aligning control force for aligning the liquid crystal molecules.

EXAMPLES 2–6

Liquid crystal devices were prepared in the same manner as in Example 1 except for changing the content (0.1 wt. %) of the amino acid derivative of the formula (5) to 0.3 wt. % (Ex. 2), 0.5 wt. % (Ex. 3), 1.0 wt. % (Ex. 4), 5.0 wt. % (Ex. 5) and 10.0 wt. % (Ex. 6), respectively.

As a result of the inverted test tube method, it was confirmed that all the resultant nematic liquid crystal compositions were in a gel state.

It was also confirmed that all the liquid crystal devices provided an alignment state as shown in FIG. 1A such that a long axis direction of the gel-forming compound molecules was in parallel with the rubbing direction.

The liquid crystal device for Ex. 2 (using the liquid crystal composition containing 0.3 wt. % of the amino acid derivative) was disposed on a stage of a polarizing microscope so that the rubbing direction of the device formed an angle of 45 degrees with one of polarizing axes under cross nicol condition of a pair of polarizers and was supplied with a rectangular waveform (±20 V, 5 kHz, pulse width=100 $\mu$sec) at the ITO electrodes 4 to evaluate an optical response characteristic.

For measurement, a photomultiplier (Model "H5784-03", mfd. by Hamamatsu Photonics K.K.) was disposed on the polarizing microscope. The liquid crystal device was illuminated with light from a halogen lamp of the polarizing microscope to detect transmitted light, thus measuring a transmitted light quantity (transmittance) at 30° C. by using an oscilloscope.

For comparison, a similar measurement was performed with respect to a liquid crystal device using only the nematic liquid crystal (TL 216) as a liquid crystal material (i.e., without using the amino acid derivative).

Figure 3A:
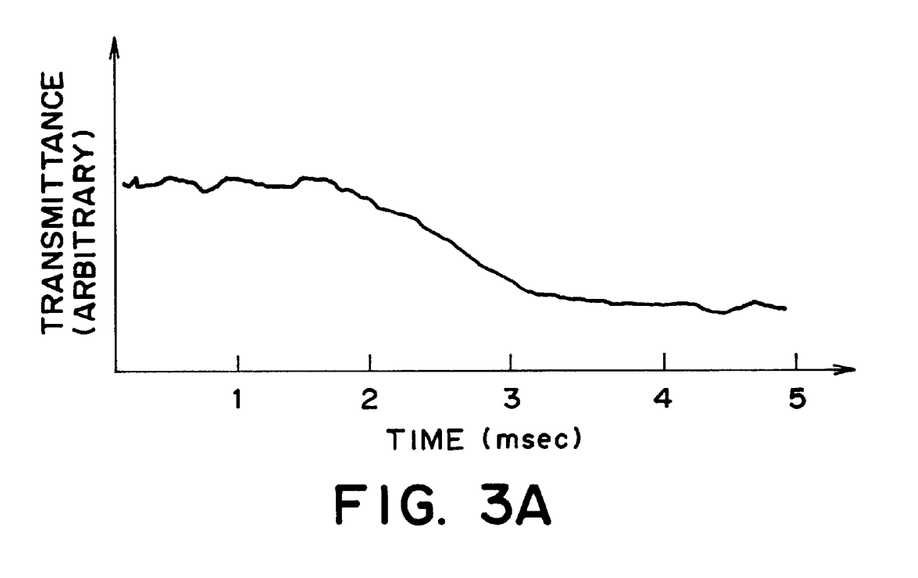
FIGS. 3A and 3B are respectively a graph showing a switching characteristic of a liquid crystal device used in Examples appearing hereinafter.
Figure 3B:
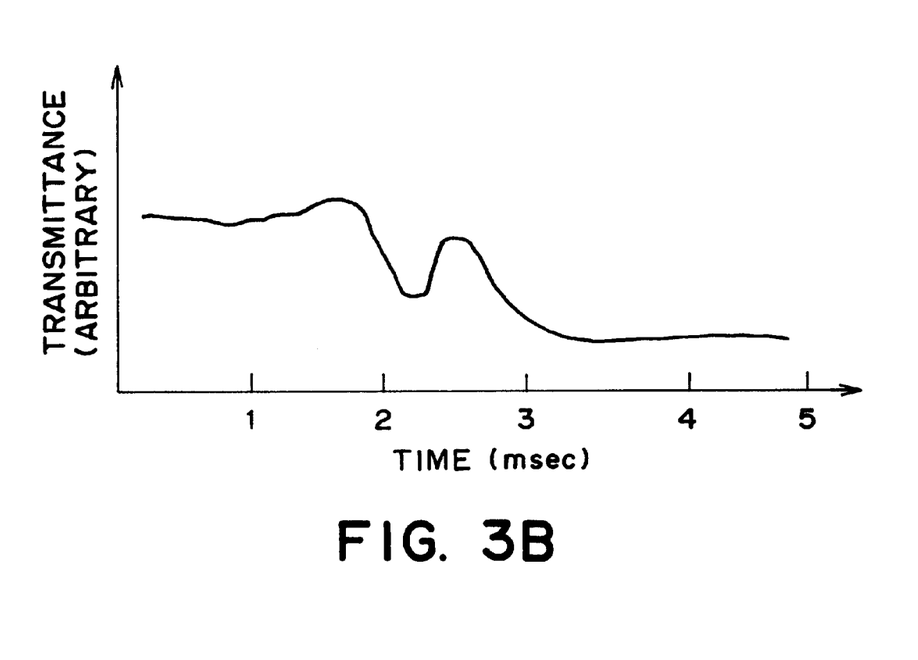

The results are shown in FIG. 3A for the device (of the present invention) using the liquid crystal composition (comprising the nematic liquid crystal and the amino acid derivative) and FIG. 3B for the comparative device using only the nematic liquid crystal. Transmittance values (ordinates) of these figures were taken as an identical scale.

Under no electric field (rectangular waveform) application, liquid crystal molecules held a homogeneous (parallel) alignment state, thus providing a maximum transmittance under cross nicol condition at a position where the long axis of liquid crystal molecules formed an angle of 45 degrees relative to the polarizing axis.

When the rectangular waveform was applied to the devices, the liquid crystal molecules of the respective liquid crystal materials (the liquid crystal composition and the nematic liquid crystal) caused switching from the homogeneous alignment state to a homeotropic (perpendicular or vertical) alignment state since the liquid crystal materials showed a negative dielectric anisotropy ($\Delta\epsilon>0$). Accordingly, in either case, the transmittance value was decreased from a maximum to a certain level and settled at the level.

Referring to FIGS. 3A and 3B, both the devices (present invention and comparative) showed comparable response times but different transmittance curves with application time (of the rectangular waveform).

Specifically, the transmittance curve of the device of the present invention as shown in FIG. 3A was substantially decreased monotonously, thus allowing a smooth switching performance.

On the other hand, the transmittance curve of the comparative device as shown in FIG. 3B was not decreased monotonously and showed a maximum value i an intermediate switching state, thus resulting in a complicated switching characteristic. Accordingly, the liquid crystal molecules in the comparative device failed to effect smooth switching, thus causing a difficulty such as flickering. This may be attributable to twisting of liquid crystal molecules, alignment defects, a difference in pretilt angle between the pair of substrates, etc.

The smooth switching performance of the device of the present invention (using the combination of the nematic liquid crystal and the amino acid derivative or the resultant gel-forming compound) may be attributable to an interaction between the gel-forming compound molecules and the nematic liquid crystal molecules.

EXAMPLES 7–9

Liquid crystal devices were prepared in the same manner as in Example 1 except that the nematic liquid crystal was changed to a smectic liquid crystal ("CS-1014", mfd. by Chisso K.K.) and the content of the amino acid derivative of the formula (5) was changed to 1.5 wt. % (for Ex. 7), 2.0 wt. % (for Ex. 6) and 5.0 wt. % (for Ex. 7), respectively.

The smectic liquid crystal (CS-1014) showed the following phase transition series.
Phase Transition Temperatures (° C.)

Iso.: isotropic phase, Ch: cholesteric (chiral nematic), SmA: smectic A phase, and SmC*: chiral smectic C phase.

As a result of the inverted test tube method, it was confirmed that all the resultant smectic liquid crystal compositions were in a gel state.

It was also confirmed that all the liquid crystal devices provided an alignment state as shown in FIG. 1B such that a long axis direction of the gel-forming compound molecules was perpendicular to the rubbing direction when the device was quickly cooled from isotropic (liquid) phase temperature to room temperature (25° C.) at a rate of 10° C./min. via SmA phase state (e.g., 59° C.).

This alignment state was not changed when heated again up to the Ch phase temperature.

By using the liquid crystal device (of the present invention) for Ex. 7 (using the combination of 1.5 wt. % of the amino acid derivative and the smectic liquid crystal (CS-1014)) and a comparative liquid crystal device using only the smectic liquid crystal (CS-1014) as a liquid crystal material, measurement of an optical response characteristic with respect to a V-T (voltage-transmittance) characteristic at 23.5° C. was performed in the same manner as in Examples 2–6 except that the devices were set to provide the darkest state under cross nicol condition and no electric field application since liquid crystal molecules of the liquid crystal materials held a homogeneous (parallel) alignment state under no electric field application.

The smectic liquid crystal (CS-1014) shows SmC* phase at room temperature, thus having ferroelectricity providing bistability (two optically stable states) when disposed between a pair of parallel-rubbed substrates with a cell gap of ca. 1 $\mu$m.

However, in the above-prepared liquid crystal devices (present invention and comparative) with a cell gap of 5 $\mu$m, the liquid crystal molecules of each of the liquid crystal materials did not assume a bistable alignment state even when the ITO electrodes of each of the devices were supplied with a pulse voltage (± several ten volts, pulse width=1 msec).

Figure 4:
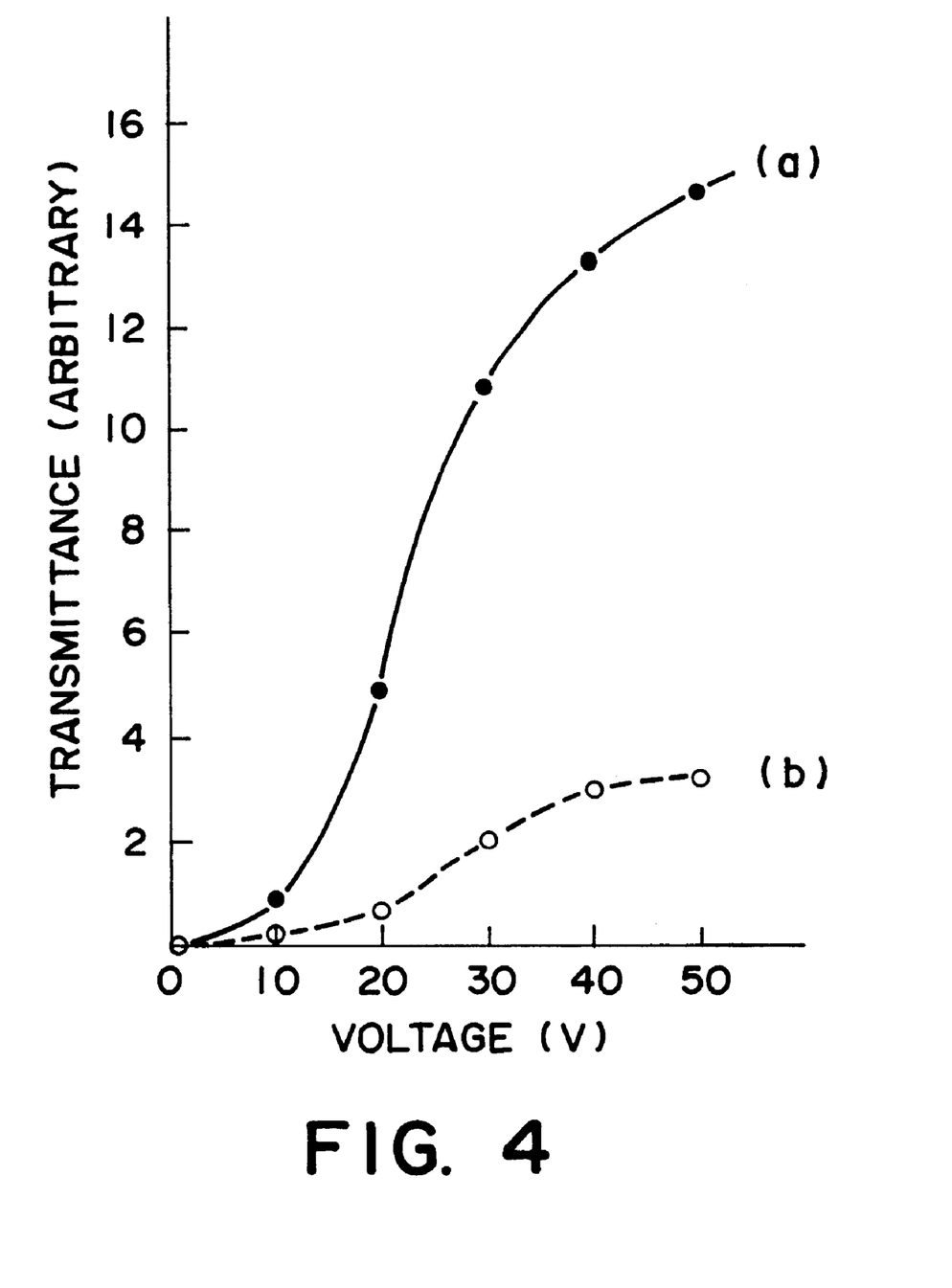
FIG. 4 is a graph showing a V-T (voltage transmittance) characteristic of liquid crystal devices used in Examples.

The V-T curves of the respective liquid crystal devices were shown in FIG. 4 including a curve (a) for the device of the present invention (using the combination of the gel-forming compound and the smectic liquid crystal) and a curve (b) for the comparative device (using only the smectic liquid crystal as the liquid crystal material).

Referring to FIG. 4, the device of the present invention (curve (a)) provided a gentle increase in transmittance with a large transmittance change with an increased voltage when compared with the comparative device (curve (b)), thus realizing an excellent gradation display performance and a high contrast.

This may be attributable to an increased switching angle for liquid crystal molecules in a planar display region during the application of electric field based on the interaction of the gel-forming compound molecules with the liquid crystal molecules, thus resulting in an increase in transmittance.

In these examples, a smooth switching performance of liquid crystal molecules between the parallel alignment state and perpendicular (vertical) alignment state could be achieved similarly as in Examples 2–6, thus ensuring wider gradational levels.

EXAMPLE 10

Then, 1.5g of carbobenzoxy-L-isoleucine (Z-Ile), 1.7g of an amine compound represented by the formula (4) shown above (in Ex. 1), 2.2g of 1-ethyl-3-(3-dimethylaminopropyl) carbodiimide (WSC), and 1.6 g of 1-hydroxy-1H-benzotriazole (HOBT) were added to 100 ml of THF.

On the ice bath, 1.6 ml of TEA was added dropwise to the mixture, followed by stirring for 2 hours and then standing overnight at room temperature. Thereafter, the resultant mixture was subjected to filtration, followed by distilling-off of the solvent and then addition of 200 ml of ethyl acetate for dissolution. The resultant solution was successively washed with 200 ml of 1N-HCL solution, 200 ml of saturated sodium hydrogencarbonate and water, followed by drying with anhydrous magnesium sulfate. Thereafter, the resultant solution was concentrated by evaporation under reduced pressure, followed by re-crystallization from a mixture solvent of ethyl acetate and hexane to obtain 2.2g of an objective amino acid derivative represented by the following formula (6).

(formula 6)

The thus-prepared amino acid derivative of the formula (6) and a nematic liquid crystal ("TL216", mfd. by Merck Co.) were mixed so as to provide a content of the amino acid derivative of the formula (6) of 0.15 wt. %.

The mixture was dissolved in chloroform and subjected to ultrasonic treatment to prepare a liquid crystal mixture solution, followed by distilling-off of the solvent to obtain a nematic liquid crystal composition.

After cooling the liquid crystal composition to room temperature, the liquid crystal composition was subjected to the inverted test tube method in the same manner as in Example 1, thus confirming a gel state of the liquid crystal composition.

A liquid crystal device was prepared and subjected to observation through a polarizing microscope in the same manner as in Example 1.

As a result, the resultant gel-forming compound molecules were found to assume an alignment state as shown in FIG. 1A such that the long axis direction of the gel-forming (fibrous) compound molecules was aligned with (in parallel to) the rubbing direction.

EXAMPLES 11–13

Liquid crystal devices were prepared and evaluated in the same manner as in Example 10 except for changing the content (0.15 wt. %) of the amino acid derivative of the formula (6) to 1.5 wt. % (Ex. 11), 3.0 wt. % (Ex. 12) and 10.0 wt. % (Ex. 13), respectively.

As a result of the inverted test tube method, it was confirmed that all the resultant nematic liquid crystal compositions were in a gel state.

It was also confirmed that all the liquid crystal devices provided an alignment state as shown in FIG. 1A such that a long axis direction of the gel-forming compound molecules was in parallel with the rubbing direction.

EXAMPLES 14–17

Liquid crystal devices were prepared in the same manner as in Example 10 except that the nematic liquid crystal was changed to a smectic liquid crystal ("CS-1014", mfd. by Chisso K.K.) (used in Examples 7–9) and the content of the amino acid derivative of the formula (6) was changed to 0.15 wt. % (for Ex. 14), 1.5 wt. % (for Ex. 15), 3.0 wt. % (for Ex. 16) and 10.0 wt. % (for Ex. 17), respectively.

As a result of the inverted test tube method, it was confirmed that all the resultant smectic liquid crystal compositions were in a gel state.

It was also confirmed that all the liquid crystal devices provided an alignment state as shown in FIG. 1B such that a long axis direction of the gel-forming compound molecules was perpendicular to the rubbing direction when the device was quickly cooled from isotropic (liquid phase temperature to room temperature (25° C.) at a rate of 10° C./min. via SmA phase state (e.g., 59° C.).

This alignment state was not changed when heated again up to the Ch phase temperature.

COMPARATIVE EXAMPLE 1

A liquid crystal device was prepared in the same manner as in Example 1 except that 0.1 wt. % of the amino acid derivative of the formula (5) was changed to 0.15 wt. % of a low-molecular weight compound of the following formula (7).

(formula 7)

The low-molecular weight compound of the formula (7) was found to be crystallized in a random direction in the resultant liquid crystal composition.

As described hereinabove, according to the liquid crystal device of the present invention, the liquid crystal composition placed in a gel state assumes such an alignment state that gel-forming compound molecules are aligned in a direction parallel or perpendicular to a uniaxial aligning axis direction (rubbing direction), thus breaking a long-range order of liquid crystal molecules and providing only a short-range order to the liquid crystal molecules. As a result, it is possible to realize a liquid crystal display device exhibiting a high contrast, a smooth switching performance due to improvement in liquid crystal switching behavior, and an excellent gradation display characteristic. Further, by appropriately controlling an alignment state as the gel-forming compound in the liquid crystal composition, it is also possible to use the gel-forming compound portion as a template for aligning the liquid crystal molecules.

What is claimed is:

1. A liquid crystal device, comprising:
   a pair of substrates each provided with an axis for aligning liquid crystal molecules in a uniaxial aligning direction, and
   a liquid crystal composition disposed between the pair of substrates and comprising at least a liquid crystal and an aligned gel-forming compound forming a gel with the liquid crystal, wherein
   said gel-forming compound is aligned in a particular direction defined relative to the uniaxial aligning direction.

2. A device according to claim 1, wherein the particular direction is a direction substantially parallel or perpendicular to the uniaxial aligning direction.

3. A device according to claim 1, wherein said gel-forming compound provides a supermolecular structure.

4. A device according to claim 1, wherein said gel-forming compound has at least one intermolecular interacting portion capable of interacting multi-dimensionally.

5. A device according to claim 4, wherein said at least one intermolecular interacting portion comprises at least one amido group.

6. A device according to claim 1, wherein said gel-forming compound interacts with the uniaxial aligning axes to form a one-dimensional aggregation structure.

* * * * *